United States Patent [19]

Ohyama et al.

[11] Patent Number: 5,015,009
[45] Date of Patent: May 14, 1991

[54] ACTIVE SUSPENSION SYSTEM AND METHOD FOR CONTROLLING SAME

[75] Inventors: Yasuharu Ohyama; Masaki Izawa; Katsuji Watanabe; Tetsuro Hamada, all of Saitama, Japan

[73] Assignee: Honda Giken Kogyo Kabushiki Kaisha, Tokyo, Japan

[21] Appl. No.: 474,620

[22] Filed: Feb. 5, 1990

[30] Foreign Application Priority Data

Feb. 6, 1989 [JP] Japan .................................. 1-27100

[51] Int. Cl.⁵ .............................................. B62D 9/02
[52] U.S. Cl. .................................... 280/772; 280/707; 280/DIG. 1
[58] Field of Search .......... 280/772, 707, 714, DIG. 1

[56] References Cited

U.S. PATENT DOCUMENTS

| | | | |
|---|---|---|---|
| 4,589,678 | 5/1986 | Lund .................................... | 280/772 |
| 4,761,022 | 8/1988 | Ohashi et al. ........................ | 280/772 |
| 4,830,394 | 3/1989 | Tanaka et al. ....................... | 280/772 |
| 4,872,701 | 10/1989 | Akatsu et al. ........................ | 280/772 |

FOREIGN PATENT DOCUMENTS 62-295714 12/1987 Japan .
63-11408 1/1988 Japan .

*Primary Examiner*—Kenneth R. Rice
*Attorney, Agent, or Firm*—Armstrong, Nikaido, Marmelstein, Kubovcik & Murray

[57] ABSTRACT

An active suspension system and an active suspension control method for a vehicle having a first wheel set and a second wheel set, comprising a power actuator interposed between the vehicle body and each of the wheels; a sensor for detecting turning maneuver of the vehicle; and a control unit for controlling operation of the actuators according to data obtained from the sensor so as to reduce a vertical load acting on the inner wheel of the second wheel set which bears a less vertical load than the first wheel set during the turning maneuver. Thereby, the shifting of the vertical load between the wheels of the first wheel set is reduced with the result that the overall cornering force of the vehicle is maximized because of the saturating property of the maximum cornering force of the tire in relation with the vertical load acting thereon.

7 Claims, 3 Drawing Sheets

ACTIVE SUSPENSION SYSTEM AND METHOD FOR CONTROLLING SAME

TECHNICAL FIELD

The present invention relates to an active suspension system and an active suspension control method for a vehicle which actively and electronically controls the position and attitude of a vehicle body by using, hydraulic pneumatic or other fluid force actuators, and in particular to an active suspension control device and method which can improve the capability of the vehicle to undergo a turning maneuver in a high lateral acceleration condition.

BACKGROUND OF THE INVENTION

Conventionally, there is known a so-called active suspension system which improves the maneuvering capability and the riding comfort of the vehicle by electronically controlling hydraulic or pneumatic actuators arranged between the vehicle body and the wheels. For instance, Japanese patent laid open publication No. 63-11408 discloses an active suspension control system which improves the stability of a vehicle by controlling the actuators so as to change the ratio of loads acting upon the front and rear wheels and thereby modifying its dynamic properties related to turning maneuver depending on the conditions of the intended turning maneuver. Japanese patent laid open publication No. 62-295714 discloses an active suspension system for a vehicle which ensures a stable maneuvering of the vehicle by continually controlling a pressure control valve according to the magnitude of a lateral acceleration or a fore-and-aft acceleration of the vehicle so as to adjust a fluid pressure cylinder and reduces the roll or the yaw motion of the vehicle.

The stability of a vehicle is ensured as long as the cornering forces acting on the front wheel set and the rear wheel set are both large enough to support the vehicle against the lateral inertia force due to the lateral acceleration arising during a turning maneuver. In other words, in order for a four wheeled vehicle to maintain a stable running condition during a turning maneuver, both the front and rear wheel sets must continue to provide sufficiently large cornering forces. The cornering force of each of the wheel sets is given as the sum of the cornering forces of the right and left wheels.

It is well known that the relationship between the maximum cornering force of a vehicle tire undergoing a turning maneuver and its vertical load has a nonlinear property. The maximum cornering force increases in proportion with the increase in the vertical load of the tire when the vertical load is relatively small, but its rate of increase diminishes as the vertical load increases beyond a certain level as can be seen from FIG. 4. In other words, the maximum cornering force of a vehicle tire saturates and cannot increase indefinitely as the vertical load acting on the tire increases beyond a certain limit. Therefore, the total cornering force of either the front wheel set or the rear wheel set bearing a larger part of the overall vehicle weight is critical in determining the overall stability of the vehicle because the wheel set which is closer to the center of gravity of the vehicle is subjected to a larger lateral inertia force due to the lateral acceleration during a turning maneuver and a larger vertical load, and therefore reaches such a saturated part of the cornering force property before the other wheel set. The weight distribution varies depending on the position of the engine and the general layout of the vehicle, and is also affected by the weight of the vehicle occupants and the cargo as well as the acceleration and deceleration conditions of the vehicle.

Further, during a cornering maneuver, the vehicle is subjected to a rolling moment because the lateral inertia force acts upon the vehicle acts at its center of gravity which is located well above the road surface, and this rolling moment shifts the distribution of the load acting on the right and left wheels of each wheel set laterally or between them, and the vertical load acting on the outer wheel becomes greater than that acting on the inner wheel. As can be seen by referring again to FIG. 4, between the total cornering force of each wheel set when the shifting of the load to the outer wheel is small or $C_{F1i}+C_{F1o}$ and the total cornering force when the shifting of the load to the outer wheel is large or $C_{F2i}+C_{F2o}$, the relationship $C_{F1i}+C_{F1o} > C_{F2i}+C_{F2o}$ holds. Therefore, as the difference in the loads acting on the inner and outer wheels increases due to the increase in the lateral inertia force or the centrifugal force and the amount of lateral load shift thereby increases, the overall cornering force of each wheel set diminishes.

Therefore, according to the conventional passive suspension combining a spring and a damper, it was not possible to prevent the drop in the cornering force depending on the state of the turning maneuver of the vehicle, and improvements in the capability of the vehicle for turning maneuver and the stability of the vehicle were difficult to achieve.

BRIEF SUMMARY OF THE INVENTION

In view of such problems of the prior art and the recognitions by the inventors, a primary object of the present invention is to provide an active suspension system and a suspension control method which can prevent the drop in the cornering force due to the shifting of load between the inner and outer wheels during a turning maneuver involving a large lateral acceleration.

A second object of the present invention is to provide an active suspension system and a suspension control method which can improve the turning capability of a vehicle with a minimum amount of modification to an existing active suspension control system.

According to the present invention, such an object can be accomplished by providing an active suspension system for a vehicle having a first wheel set and a second wheel set, each wheel set including a right wheel and a left wheel, comprising: wheel supporting means pivotably coupling each of a plurality of wheels of a vehicle with a vehicle body so as to support the associated wheel in a vertically moveable manner; a power actuator interposed between the vehicle body and each of the wheels; sensor means for detecting turning maneuver of the vehicle; and control means for controlling operation of the actuators according to data obtained from the sensor means so as to reduce a vertical load acting on an inner one of the wheels of the second wheel set which bears a less vertical load than said first wheel set, for instance by lifting it, when it is detected by the sensor means that the vehicle is undergoing a turning maneuver which gives rise to a lateral acceleration exceeding a certain limit.

Thus, by reducing the vertical load acting upon the inner front or rear wheel of the second wheel set which is subjected to a relatively small load during the turning maneuver in question, and thereby decreasing the vertical load acting on the outer wheel of the first wheel set which is subjected to a relatively large load during such a turning maneuver, the difference in the loads acting upon the right and left wheels of the second wheel set which is subjected to a relatively small load can be reduced as compared with the prior art when the shifting of load takes place due to the lateral inertia force arising during the turning maneuver owing to certain relationships existing between the vertical forces acting on the respective wheels as set forth in detail in the following, and the overall running stability of the vehicle can be improved.

BRIEF DESCRIPTION OF THE DRAWINGS

Now a preferred embodiment of the present invention is described in the following with reference to the appended drawings, in which.

DETAILED DESCRIPTION OF THE PREFERRED EMBODIMENT

According to the present invention, a suspension unit is provided between each of four wheels arranged on four diagonal parts of a four-wheel automobile and its vehicle body. Since the four suspension units 1 are substantially identical in structure, only the front right wheel is described in the following as an example by referring to FIG. 1.

Figure 1:
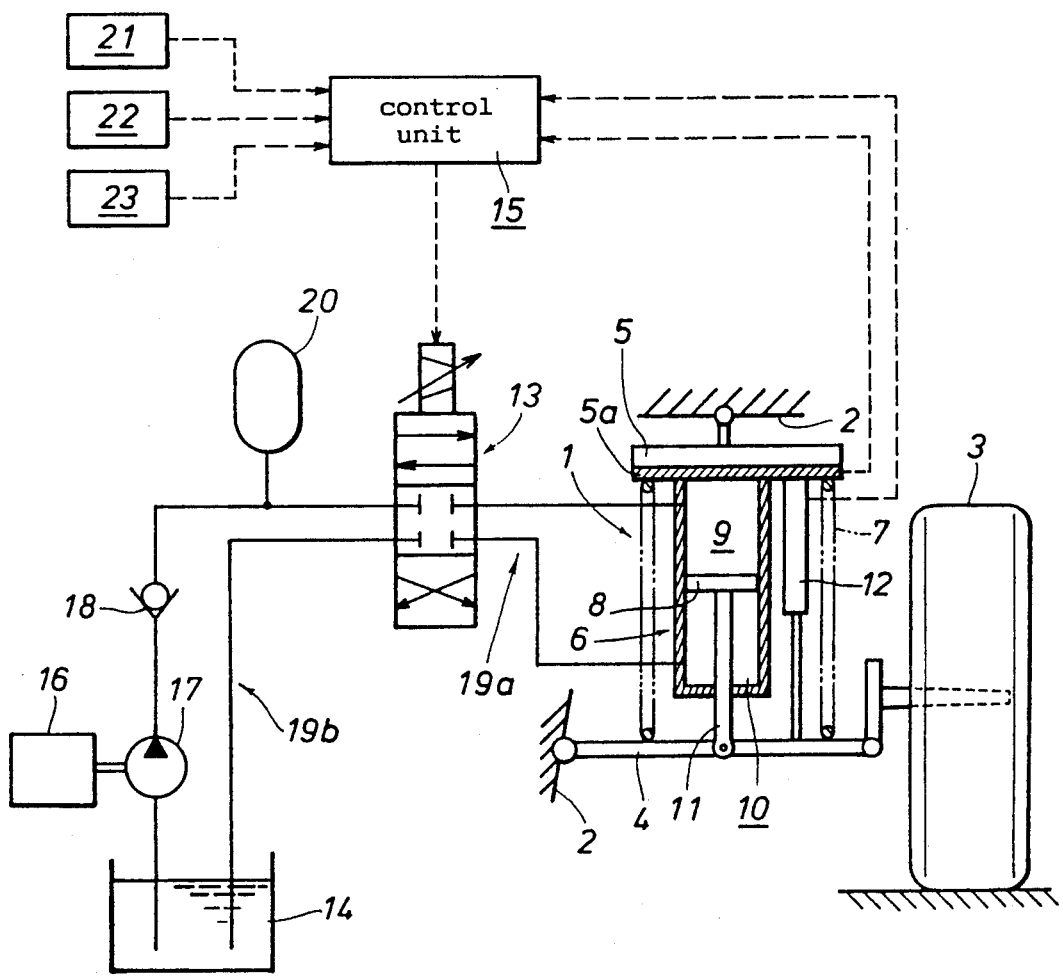
FIG. 1 is a block diagram of a preferred embodiment of the active suspension system according to the present invention.

In FIG. 1, the suspension unit 1 comprises a suspension arm 4 pivotably supported by a vehicle body 2 at its one end and supports a wheel 3 at its other end, a load sensor 5a carried by an upper suspension member 5 pivotably supported by the vehicle body 2, a hydraulic cylinder 6 coupled between the suspension arm 4 and the load sensor 5a, and a coil spring 7 connected in parallel with and surrounding the hydraulic cylinder 6. The load sensor 5a measures the vertical load acting on the wheel 3. The hydraulic cylinder 6 consists of a double-acting hydraulic cylinder which is internally divided into an upper chamber 9 and a lower chamber 10 by a piston 8, and hydraulic fluid can be supplied to either of the chambers at an appropriate pressure and flow rate. A piston rod 11 extending downwards from the piston 8 is connected to an intermediate part of the suspension arm 4 at its lower end in a freely pivotable manner. The coil spring 7 is intended to support only the static load of the vehicle body, and may have a small spring constant. As a matter of fact, the present invention can be implemented without using the coil spring 7 at all. A stroke sensor 12 is interposed between the upper suspension member 5 and the suspension arm 4 in parallel with the hydraulic cylinder 6 and the coil spring 7. The stroke sensor 12 may consist of, for instance, a potentiometer or a differential transformer, and detects the displacement of the suspension unit 1 in either direction from its rest position.

A servo valve 13 is connected to the upper chamber 9 and the lower chamber 10 of the hydraulic cylinder 6 for each of the wheels via a conduit system 19a to control the pressure and flow rate of the hydraulic fluid supplied thereto, and is connected to an oil tank 14 serving as a common source of hydraulic fluid for all the suspension units 1 via a conduit system 19b. The servo valve 13 consists of a normal four-port solenoid valve as illustrated in FIG. 1, and its operation is controlled by a control unit 15 consisting of a computer. The oil received in the oil tank 14 is drawn by a pump 17 actuated by an engine 16, and is sent, under pressure, to the conduit system 19b including a one-way valve 18. The oil is then supplied to each of the servo valves 13 of the different suspension units 1 after its pressure is controlled to a substantially fixed level by an accumulator 20. The pump 7 may not necessarily be actuated by the engine, but may be actuated by other force means.

The control unit 15 is also connected to the load sensor 5a and the stroke sensor 12 so as to obtain data on the magnitude of the vertical load acting on each of the wheels 3 and the displacement of each of the suspension units 1. The control unit 15 is additionally connected to a steering angle sensor 21, a lateral acceleration sensor 22, and a vehicle speed sensor 23. The steering angle sensor 21 is for instance mounted on the front steering gear box, and detects the steering angle of the front wheels and supplies its output to the control unit 15. The lateral acceleration sensor 22 detects the lateral acceleration or a lateral G value acting upon the vehicle. It is also possible to use a yaw sensor instead of a lateral acceleration sensor.

The control unit 15 receives data on the turning maneuver conditions of the vehicle according to the steering angle, the lateral acceleration (or the lateral G value) and the vehicle speed detected by the respective sensors. For instance, if all these values are higher than certain threshold levels, it can be determined that the vehicle is turning either to the right or to the left. The distribution of the weight of the vehicle to the front and rear wheel sets can be determined by the mounting position of the engine and the layout of the vehicle, but is also affected by the conditions of the vehicle occupants and the cargos as well as by the deceleration and acceleration of the vehicle. Therefore, the control unit 15 determines which of the front wheel set and the rear wheel set is bearing a larger part of the vehicle weight according to the distribution of the vertical loads among the wheels as supplied from the load sensor 5a of each of the suspension units.

For instance, when the front wheels are bearing a larger part of the vehicle weight as is the case with front engine, front wheel drive vehicles, the control unit 15 determines the direction of the steering angle detected by the steering angle sensor when the lateral acceleration as determined by the vehicle speed and the steering angle or the lateral acceleration as measured by the lateral acceleration sensor is high (alternatively, the control unit 15 may detect the direction of the steering angle as well as the magnitude of the lateral acceleration directly from the output of the lateral acceleration sensor), and controls the servo valve 13 and actuates the hydraulic cylinder 6 so as to lift the inner rear wheel which is diagonally opposed to the outer front wheel and to reduce the vertical load of the inner rear wheel. In other words, in the case of a vehicle having its front wheels bearing a larger part of the vehicle weight than its rear wheels, when the vehicle is turning right the right rear wheel is lifted, and when the vehicle is turning left the left rear wheel is lifted. In this instance, it is sufficient if the vertical load of the inner rear wheel is reduced substantially to zero even when the wheel is still in contact with the road surface.

Conversely, if the rear wheels bear a larger part of the vehicle weight than the front wheels as is the case with front engine, rear wheel drive vehicles, this control process is carried out so as to lift the front inner wheel. In this way, this invention can be applied to vehicles of various types, and can even be adapted to vehicles in which the wheel set carrying a larger part of the vehicle weight changes from the front wheel set to the rear wheel sent set and from the rear wheel set to the front wheel set according to the conditions of the vehicle. If desired, this change can be detected by analyzing data from the load sensors $5a$ which indicate the magnitudes of the vertical loads acting on the respective wheels.

Figure 2:
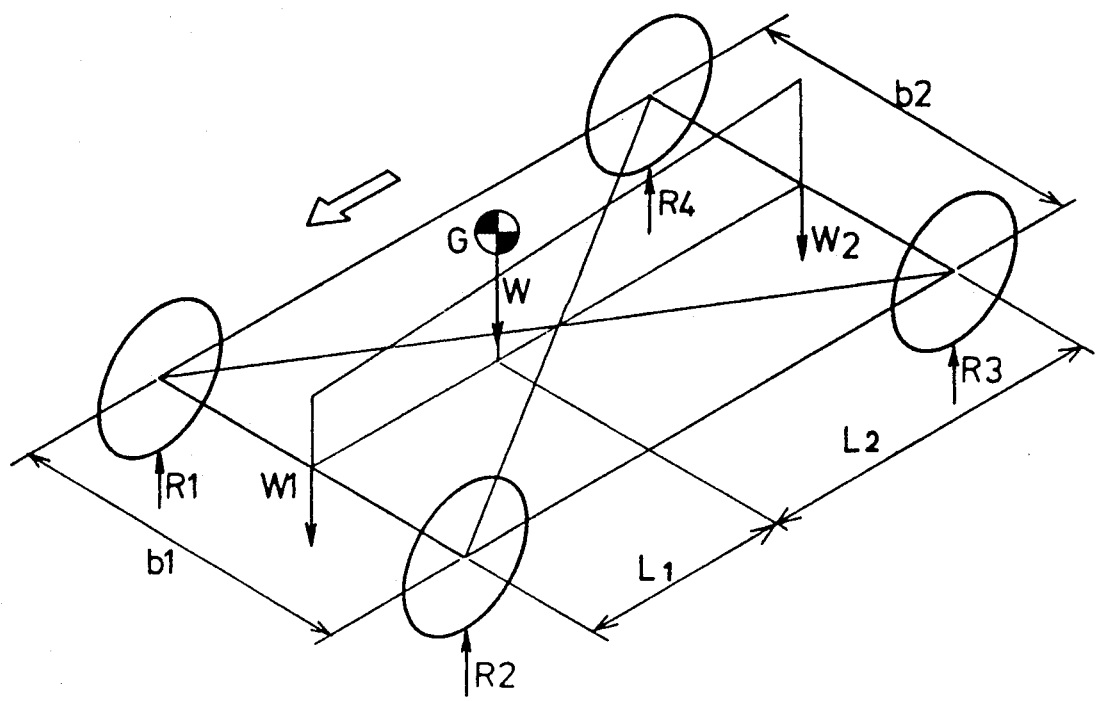
FIG. 2 is a schematic perspective view illustrating the positions of the four wheels of a vehicle relative to its center of gravity and vertical loads acting thereon.

The vertical loads acting on the individual wheels and the location of the overall vertical load of the vehicle during a rest condition are now considered in the following with reference to FIG. 2 in which W denotes the weight of the vehicle, b1 and b2 denote the threads of the front wheel set and the rear wheel set, respectively, and L1 and L2 denote the distance of the front axle and the rear axle from the gravitational center G of the vehicle, respectively. If the loads acting on the front and rear wheel sets are W1 and W2, respectively, and the vertical loads acting on the individual wheels are R1, R2, R3 and R4, the following relations hold:

$$W1 = R1 + R2 = WL2/(L1+L2)$$

$$W2 = R3 + R4 = WL1/(L1+L2)$$

Since the vertical loads acting on the right and left wheels are normally uniform in static condition, $$\begin{aligned} R1 &= R2 = WL2/2(L1+L2) \\ R3 &= R4 = WL1/2(L1+L2) \end{aligned} \quad (1)$$

According to the present invention, when a vehicle having a relatively large front wheel load is making a right turn, the inner or the right rear wheel located diagonally opposite to the outer or left front wheel is lifted. In other words, when the vertical load R4 of the right rear wheel is reduced to zero, the vertical load of the left rear wheel is given by $$R3 = W2 = WL\tfrac{1}{2}(L1+L2) \quad (2)$$

As a result, a shifting of load occurs between the right and left front wheels. If the amount of load shift is given by $\delta R$, the vertical loads acting on the left and right wheels after the right rear wheel is lifted are given by the following equations:

$$R1 = WL2/2(L1+L2) + \delta R \quad (3)$$

$$R2 = WL\tfrac{1}{2}(L1+L2) - \delta R \quad (4)$$

Figure 3:
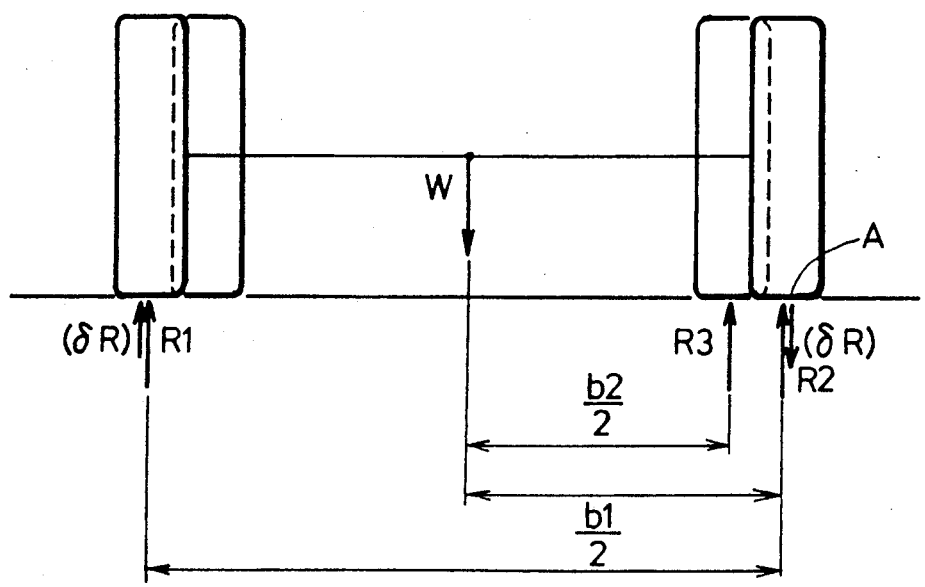
FIG. 3 is a schematic front view illustrating shifting of the overall vertical load acting on the vehicle.

When the balance of moment around a longitudinal axial line of the vehicle passing through the point of contact A of the left front wheel with the road surface is considered as illustrated in FIG. 3, $$(R1 \times b1) = (W \times b\tfrac{1}{2}) + \{R3 \times (b\tfrac{1}{2} - b2/2)\} = 0 \quad (5)$$

By solving equations (2) through (5) for $\delta R$, one obtains $$\delta R = WL1b2/2(L1+L2)b1 \quad (6)$$

Hence, $$R1 = W(L2b1 - L1b2)/2(L1+L2)b1 \quad (7)$$

$$R2 = W(L2b1 - L1b2)/2(L1+L2)b1 \quad (8)$$

Figure 4:
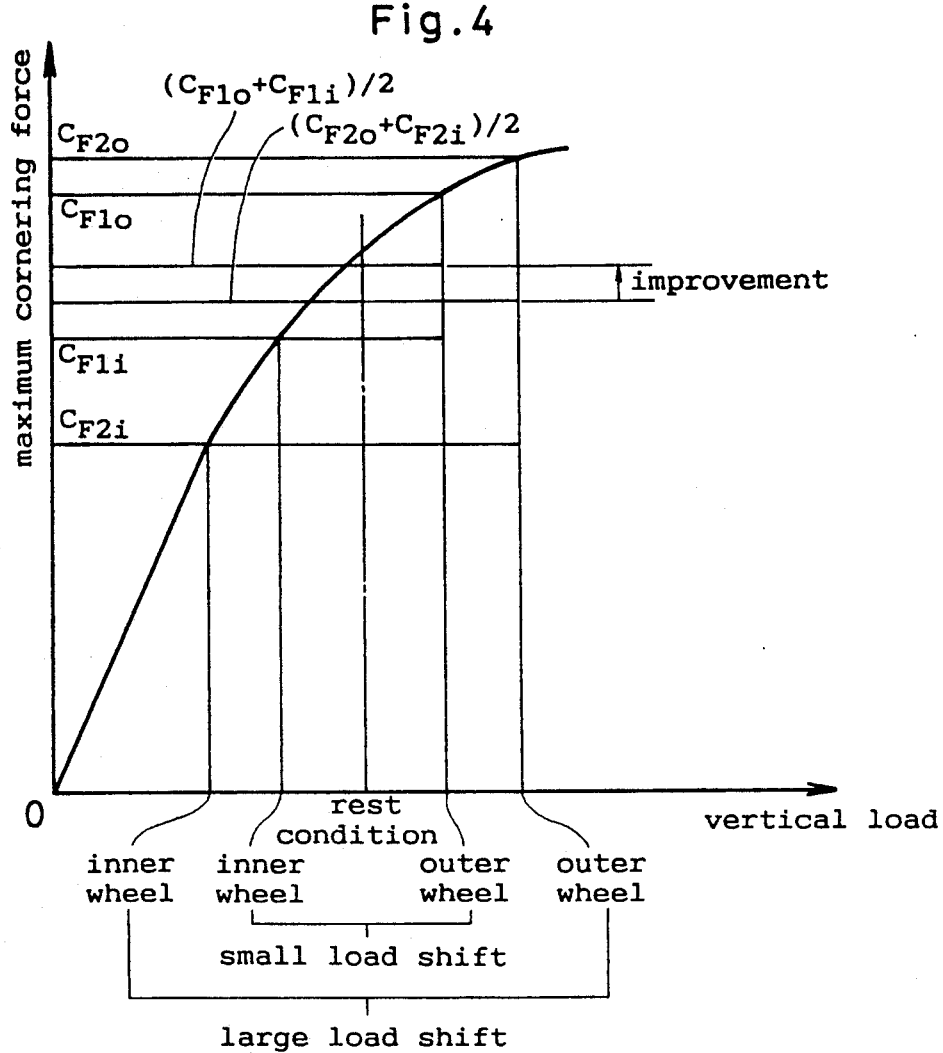
FIG. 4 is a graph of the relationship between vertical load and the maximum cornering force.

In order to maintain a stable state of the vehicle body even after the rear right wheel is lifted, it is necessary that $R2 > 0$ or $L2b1 - Lib2 > 0$. If $b1 = b2$, it suffices if $L2 > L1$. A shifting of load occurs between the right and left rear wheels also, but since a larger part of the overall vertical load is born by the front wheel set the vertical load acting on the outer rear wheel would not reach the nonlinear part or the saturated part of the vertical load versus cornering force curve (FIG. 4). This is particularly the case, when the vehicle is decelerating and the overall vertical load is shifted forward thereby.

When the vehicle is turning, the vertical load thereof is shifted laterally from the inner wheels to the outer wheels due to the rolling moment arising from the centrifugal force acting on the gravitational center of the vehicle. If the amount of this shift is given by $\delta R'$, the vertical loads acting on the right and left front wheels during a turning maneuver are given by:

$$R1 = WL2/2(L1+L2) + \delta R - \delta R' \quad (9)$$

$$R2 = WL\tfrac{1}{2}(L1+L2) - \delta R + \delta R' \quad (10)$$

Thus, the difference in the vertical loads acting on the right and left front wheels is reduced from $2\delta R'$ to $2(\delta R' - \delta R)$. Thus, it amounts to the shifting of the vertical load acting on the right and left front wheels is reduced, and the sum of the cornering forces of the right and left wheels being increased. This can be readily understood by referring to FIG. 4 which shows that the increase rate of the overall cornering force diminishes as the vertical load on the outer wheel increases and reaches a substantially nonlinear (saturated) part of the load versus cornering force curve while the vertical load on the inner wheel remains in the linear part of the curve (or $C_{F1i} + C_{F1o} > C_{F2i} + C_{F2o}$). Therefore, overall cornering force of the vehicle is increased, and its turning limit can be increased.

The control of the hydraulic cylinder 6 by the control unit 15 consists of an initialization process for assigning initial values to a vehicle height reference value and the static loads acting of the wheels at the vehicle height reference value, a reading process for accepting data from the sensors, and a process of carrying out a bouncing control for each of the wheels according to a predetermined spring constant and damping factor.

Figure 5:
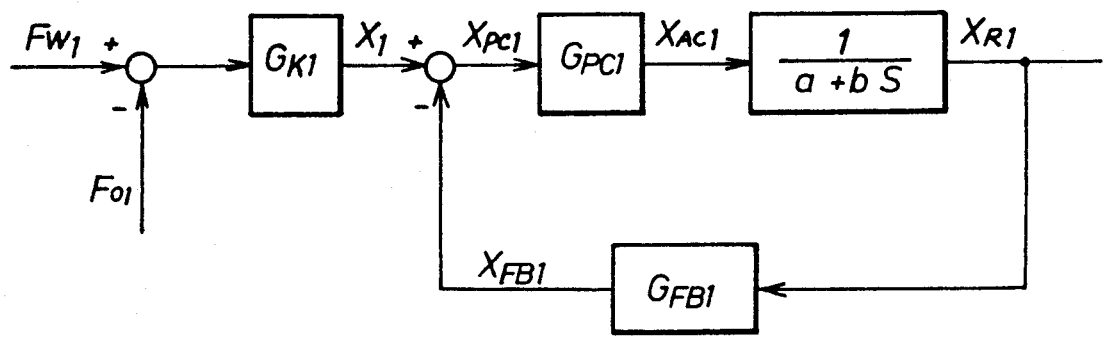
FIG. 5 is a block diagram showing an example of the transfer function of the main control action according to the present invention.

The control unit 15 can control each of the suspension units according to a feedback circuit such as the one given in FIG. 5. Specifically, by comparing a load $F_{W1}$ received from the load sensor $5a$ with a predetermined static load $F_{O1}$, and a target displacement $X_1$ is obtained by multiplying a certain predetermined coefficient $G_{K1}$ to their difference. Then, this target displacement $X_1$ is compared with an actual displacement $X_{FB1}$ from a neutral position of the suspension unit obtained from the stroke sensor 12, and the displacement of the suspension unit 1 which is to be corrected is obtained by using this difference $X_{pC1}$ as a relative deviation. The control quantity $X_{AC1}$ of the servo valve 13 is determined by multiplying a certain predetermined coefficient $G_{PC1}$ to the relative deviation $X_{PC1}$. The control unit 15 drives the servo valve 13 according to this obtained control quantity $X_{AC1}$. Thus, the hydraulic cylinders 6 are actuated, and the suspension units 1 are moved in vertical direction. Then, the displacement $X_{R1}$ of each of the suspension units 1 is detected by the associated stroke sensor 12, and the displacement $X_{FB1}$ is obtained by multiplying the predetermined coefficient $G_{FB1}$ thereto so that this quantity may be fed back and compared with the target displacement $X_1$. This process is repeated until the displacement of the suspension unit reaches the target displacement. This process may be carried out as a digital control process by a CPU incorporated in the control unit 15.

During such a bouncing control process consisting of a feedback control process, a control action consisting of lifting of a desired wheel is carried out according to the running condition of the vehicle or according to the magnitude of lateral acceleration.

The control unit 15 can control each of the suspension units according to a feedback circuit such as the one given in FIG. 5. Specifically, by comparing a load $F_{W1}$ received from the load sensor 5a with a predetermined static load $F_{O1}$, and a target displacement $X_1$ is obtained by multiplying a certain predetermined coefficient $G_{K1}$ to their difference. Then, this target displacement $X_1$ is compared with an actual displacement $X_{FB1}$ from a neutral position of the suspension unit obtained from the stroke sensor 12, and the displacement of the suspension unit 1 which is to be corrected is obtained by using this difference $X_{PC1}$ as a relative deviation. The control quantity $X_{AC1}$ of the servo valve 13 is determined by multiplying a certain predetermined coefficient $G_{PC1}$ to the relative deviation $X_{PC1}$. The control unit 15 drives the servo valve 13 according to this obtained control quantity $X_{AC1}$. Thus, the hydraulic cylinders 6 are actuated, and the suspension units 1 are moved in vertical direction. Then, the displacement $X_{R1}$ of each of the suspension units 1 is detected by the associated stroke sensor 12, and the displacement $X_{FB1}$ is obtained by multiplying the predetermined coefficient $G_{FB1}$ thereto so that this quantity may be fed back and compared with the target displacement $X_1$. This process is repeated until the displacement of the suspension unit reaches the target displacement. This process may be carried out as a digital control process by a CPU incorporated in the control unit 15.

During such a bouncing control process consisting of a feedback control process, a control action consisting of lifting of a desired wheel is carried out according to the running condition of the vehicle or according to the magnitude of lateral acceleration.

In the above described embodiment, hydraulic cylinders were used as the actuators for the suspension units, but they may be replaced by other fluid pressure cylinders such as pneumatic cylinders, and electric motors.

Thus, according to the present invention, the shifting of load from either the front or the rear inner wheel supporting a relatively larger part of the vehicle weight to the associated outer wheel during a turning maneuver can be reduced by detecting a turning maneuver of the vehicle, and lifting the inner wheel which is diagonally opposed to the outer wheel supporting a relatively larger load with the associated hydraulic cylinder so as to reduce its vertical load to zero, the turning maneuver limit can be raised, and the overall cornering force of the vehicle can be increased, with the result that the turning capability of the vehicle is improved, and the stability of the vehicle motion can be increased.

While the invention has been particularly shown and described in reference to preferred embodiments thereof, it will be understood by those skilled in the art that changes in form and details may be made therein without departing from the spirit and scope of the invention.

What we claim is:

1. An active suspension system for a vehicle having a first wheel set and a second wheel set which bears a smaller load than said first wheel set under a static condition, each wheel set including a right wheel and a left wheel, comprising:
   wheel supporting means pivotably coupling each of a plurality of wheels of a vehicle with a vehicle body so as to support the associated wheel in a vertically moveable manner;
   a power actuator interposed between said vehicle body and each of said wheels;
   sensor means for detecting turning maneuver of said vehicle and for outputting vehicle turning data; and
   control means for controlling operation of said actuators according to said data received from said sensor means so as to reduce a vertical load acting on one of the wheels of said second wheel set which acts as an inner wheel during a vehicle turn when said sensor means detects that said vehicle is undergoing a turning maneuver which gives rise to a lateral acceleration exceeding a certain limit.

2. An active suspension system according to claim 1, wherein said sensor means includes a steering angle sensor and a vehicle speed sensor.

3. An active suspension system according to claim 1, wherein said sensor means includes a lateral acceleration sensor.

4. An active suspension system according to claim 1, wherein said control means reduces said vertical load acting on said inner wheel of said second wheel set substantially to zero.

5. An active suspension system according to claim 1, wherein said control means includes means for determining which of said wheel sets bears a largest portion of an overall vertical load of the vehicle.

6. An active suspension system for a vehicle having a first wheel set and a second wheel set which bears a smaller load than said first wheel set under a static condition, each wheel set including a right wheel and a left wheel, comprising:
   wheel supporting means pivotably coupling each of a plurality of wheels of a vehicle with a vehicle body so as to support the associated wheel in a vertically moveable manner;
   a power actuator interposed between said vehicle body and each of said wheels;
   sensor means for detecting turning maneuver of said vehicle and for outputting vehicle turning data; and
   control means for controlling operation of said actuators according to said data received from said sensor means so as to lift one of the wheels of said second wheel set which acts as an inner wheel during a vehicle turn when said sensor means detects that said vehicle is undergoing a turning maneuver which gives rise to a lateral acceleration exceeding a certain limit.

7. A method for controlling an active suspension system for a vehicle having a first wheel set and a second wheel set which bears a smaller load than said first wheel set under a static condition, each wheel set including a right wheel and a left wheel, comprising the steps of: pivotably coupling each of a plurality of wheels of a vehicle with a vehicle body so as to permit the associated wheel to undergo a vertical movement;

providing an actuator interposed between said vehicle body and each of said wheels;

detecting, by a sensor means, operating condition of said vehicle including turning maneuver thereof; and controlling operation of said actuators according to data obtained from said sensor means, said controlling step including the step of lifting one of the wheels of said second wheel set which acts as an inner wheel during a vehicle turn when a turning maneuver giving rise to a lateral acceleration exceeding a certain threshold level is detected by said sensor means.

* * * * *